United States Patent
Xiong

(10) Patent No.: US 9,020,560 B2
(45) Date of Patent: Apr. 28, 2015

(54) METHOD AND DEVICE FOR MANAGING CONTACT CARD OF MOBILE TERMINAL

(71) Applicant: Huawei Device Co., Ltd., Shenzhen (CN)

(72) Inventor: Feng Xiong, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 140 days.

(21) Appl. No.: 13/776,472

(22) Filed: Feb. 25, 2013

(65) Prior Publication Data

US 2013/0172044 A1 Jul. 4, 2013

Related U.S. Application Data

(63) Continuation of application No. PCT/CN2011/076109, filed on Jun. 22, 2011.

(51) Int. Cl.
*H04M 1/00* (2006.01)
*H04W 24/00* (2009.01)
*H04M 1/2745* (2006.01)

(52) U.S. Cl.
CPC ............ *H04W 24/00* (2013.01); *H04M 1/2745* (2013.01); *H04M 2250/60* (2013.01)

(58) Field of Classification Search
CPC .............. H04W 24/00; H04M 1/2745; H04M 2250/60; G06F 3/0481; G06F 3/04842; G06Q 10/109
USPC ................ 455/550.1, 414.1, 418; 379/207.15
See application file for complete search history.

(56) References Cited

U.S. PATENT DOCUMENTS

| 7,260,419 B2 * | 8/2007 | Lee ................................ 455/566 |
| 2003/0046296 A1 * | 3/2003 | Doss et al. ..................... 707/102 |

(Continued)

FOREIGN PATENT DOCUMENTS

| CN | 1612629 A | 5/2005 |
| CN | 1988460 A | 6/2007 |

(Continued)

OTHER PUBLICATIONS

Foreign Communication From a Counterpart Application, European Application No. 11789260.4, Extended European Search Report dated Jun. 21, 2013, 5 pages.

(Continued)

*Primary Examiner* — Kashif Siddiqui
*Assistant Examiner* — Mong-Thuy Tran
(74) *Attorney, Agent, or Firm* — Conley Rose, P.C.; Grant Rodolph; Nicholas K. Beaulieu

(57) ABSTRACT

A method and a device are disclosed for managing a contact card of a mobile terminal, belonging to the mobile terminal field. The method includes: for every other preset period of time, extracting a communication event of a specific contact from a communication record of a mobile terminal; counting the number of the communication event of the specific contact according to a type of the communication event; and associating the specific contact with the communication event, so as to simultaneously display the number of the communication event of the contact when displaying the contact. A statistical result is displayed in a mobile phone contact card book, intuitively displaying a latest contact state, so that it is convenient for the user to process and maintain interpersonal communications, thereby enhancing and promoting communication and life for people.

18 Claims, 4 Drawing Sheets

(56) References Cited

U.S. PATENT DOCUMENTS

| | | | |
|---|---|---|---|
| 2004/0049541 A1* | 3/2004 | Swahn | 709/203 |
| 2004/0102225 A1* | 5/2004 | Furuta et al. | 455/566 |
| 2006/0058063 A1* | 3/2006 | Bocking et al. | 455/556.2 |
| 2007/0060205 A1* | 3/2007 | Kim | 455/566 |
| 2007/0167153 A1* | 7/2007 | Cho et al. | 455/414.1 |
| 2007/0174432 A1* | 7/2007 | Rhee et al. | 709/219 |
| 2008/0139225 A1* | 6/2008 | Hsieh et al. | 455/456.3 |
| 2008/0256107 A1 | 10/2008 | Banga et al. | |
| 2008/0263457 A1* | 10/2008 | Kim et al. | 715/753 |
| 2009/0138809 A1* | 5/2009 | Arad | 715/758 |
| 2010/0299625 A1* | 11/2010 | Li et al. | 715/777 |
| 2012/0260189 A1* | 10/2012 | Howard et al. | 715/739 |

FOREIGN PATENT DOCUMENTS

| | | | |
|---|---|---|---|
| CN | 101076064 A | 11/2007 | |
| CN | 101127797 A | 2/2008 | |
| CN | 101808170 A | 8/2010 | |
| EP | 1983731 A2 | 10/2008 | |
| JP | 11252234 A | 9/1999 | |
| JP | 2005136500 A | 5/2005 | |
| WO | 03056789 A1 | 7/2003 | |

OTHER PUBLICATIONS

Foreign Communication From a Counterpart Application, Chinese Application No. 201180000736.3, Chinese Office Action dated Apr. 3, 2013, 9 pages.

Foreign Communication From a Counterpart Application, Chinese Application No. 201180000736.3, Partial Translation of Chinese Office Action dated Apr. 3, 2013, 14 pages.

Communication from a foreign counterpart application, International Application No. PCT/CN2011/076109, English Translation, International Search Report dated Apr. 5, 2012, 3 pages.

Foreign Communication From a Counterpart Application, Chinese Application 201180000736.3, Chinese Office Action dated Nov. 27, 2012, 9 pages.

Foreign Communication From a Counterpart Application, Chinese Application 201180000736.3, Partial English Translation of Chinese Office Action dated Nov. 27, 2012, 7 pages.

Foreign Communication From a Counterpart Application, Chinese Application 201180000736.3, Chinese Office Action dated Feb. 4, 2013, 10 pages.

Foreign Communication From a Counterpart Application, Chinese Application 201180000736.3, Partial English Translation of Chinese Office Action dated Feb. 4, 2013, 9 pages.

* cited by examiner

METHOD AND DEVICE FOR MANAGING CONTACT CARD OF MOBILE TERMINAL

CROSS-REFERENCE TO RELATED APPLICATION

The present application is a continuation of International Application No. PCT/CN2011/076109, filed on Jun. 22, 2011, which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a mobile terminal field, and in particular, to a method and a device for managing a contact card of a mobile terminal.

BACKGROUND

In the modern world, mobile phones are one of the most important tools for intercommunication of people. In addition to conventional calls and short messages, more and more network communication functions are integrated into the mobile phones.

In the prior art, conventional data such as a mobile phone contact card, a call record, and a short message box are independent of each other. When a contact card book is viewed, only an individual contact way on a contact card can be seen. It is impossible to exactly know a state of contacting each contact. Neither is it possible to distinguish a person who is not contacted for a long time, a person who no longer needs to be contacted, and a person who is frequently contacted. It is inconvenient to maintain a mobile phone contact card, thereby having poor performance of contact card management and lacking a business application function.

SUMMARY

Embodiments of the present invention provide a method and a device for managing a contact card of a mobile terminal. The technical solutions are as follows:

A method for managing a contact card of a mobile terminal includes: for every other preset period of time, extracting a communication event of a specific contact within the preset period of time from a communication record of the mobile terminal; according to a type of the communication event, counting the number of communication event of the specific contact; and associating the specific contact with the communication event corresponding to the specific contact, so as to simultaneously display the number of the communication event of the specific contact when displaying the specific contact.

A device for managing a contact card of a mobile terminal includes: an extracting module configured to: for every other preset period of time, extract a communication event of a specific contact within the preset period of time from a communication record of the mobile terminal; a counting module configured to count the number of the communication event of the specific contact according to a type of the communication event; and an association and display module configured to associate the specific contact with the communication event corresponding to the specific contact, so as to simultaneously display the number of the communication event of the specific contact when displaying the specific contact.

The technical solutions provided by the embodiments of the present invention have the following beneficial effects:

The communication record of the mobile terminal is extracted and analyzed, and a state of contacting between a contact and a mobile terminal user is counted, so that it is convenient for the user to count and analyze states of contacting different contacts, analyzing and maintaining interpersonal relationships, and managing a contact card system. Meanwhile, a statistical result is displayed in a mobile phone contact card book, intuitively displaying a latest contact state, so that it is convenient for the user to process and maintain interpersonal communications, thereby enhancing and promoting communication and life for people.

BRIEF DESCRIPTION OF THE DRAWINGS

To describe the technical solutions in the embodiments of the present invention more clearly, the following briefly introduces the accompanying drawings needed for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the present invention more comprehensible, the following further describes the embodiments of the present invention in detail with reference to the accompanying drawings.

Figure 1:
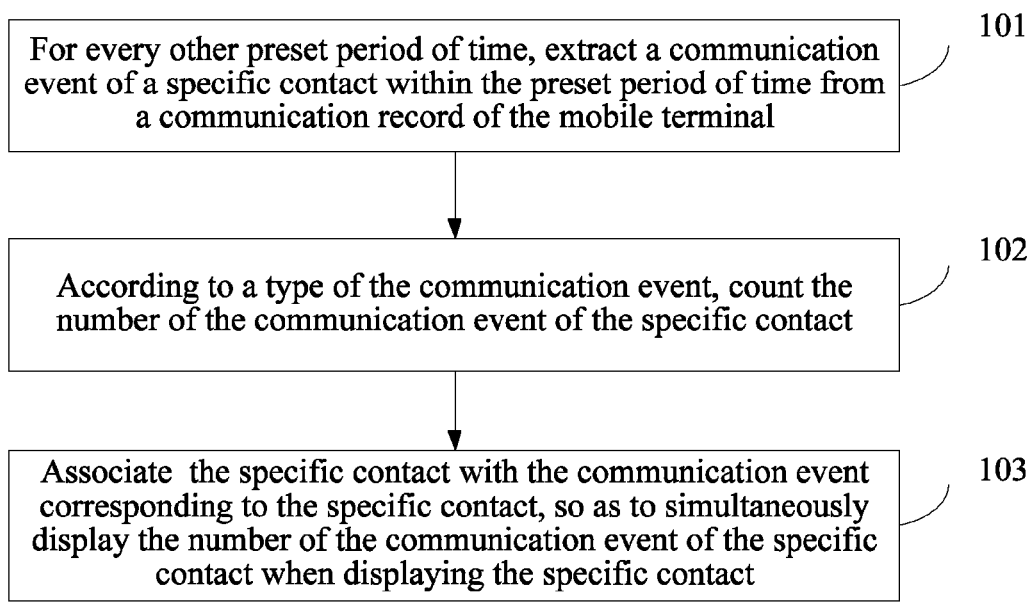
FIG. 1 is a flow chart of a method for managing a contact card of a mobile terminal according to an embodiment of the present invention.

FIG. 1 is a flow chart of a method for managing a contact card of a mobile terminal according to an embodiment of the present invention. A main body executing the embodiment of the present invention is the mobile terminal. Referring to the FIG. 1, the method includes:

101: For every other preset period of time, extract a communication event of a specific contact within the preset period of time from a communication record of the mobile terminal.

Persons skilled in the art may know that, the preset period of time may be a week, a month, half a year, or other periods of time. The preset period of time may be set by a mobile terminal user, which is not specifically limited in the embodiment of the present invention. For example, by taking the preset period of time being one month as an example, if a statistical start time is Jan. 1, 2011, a communication record of the user in a period of time from Jan. 1, 2011 to Feb. 1, 2011 is counted on Feb. 1, 2011, and a communication record of the user in a period of time from Feb. 1, 2011 to Mar. 1, 2011 is counted on Mar. 1, 2011.

In this embodiment, the communication event is an operation of the mobile terminal user associated with communication, the communication event includes four types, such as making a call, answering a call, sending a short message, and receiving a short message, etc.

102: According to the types of the communication event, counting the number of communication event of the specific contact.

In the embodiment of the present invention, the specific contact as a statistical object, which may be all contact in a contact card book, may also be one or more contact of the all contact appointed by the mobile terminal user, and may further be a specific contact in a specific contact group. The statistical object is set by the mobile terminal user according to requirements of the mobile terminal user, which is not specifically limited in the embodiment of the present invention.

103: Associate the specific contact with the communication event corresponding to the specific contact, so as to simultaneously display the number of the communication event of the specific contact when displaying the specific contact.

In the embodiment of the present invention, the counted number of the communication event is associated with a contact each time the counting ends, and a previously counted number of the communication event is deleted at the same time of the associating. In another embodiment, when the preset period of time exceeds a preset range, pre-counting may be performed on a communication record by stages, that is, the communication record is counted once for every other first preset sub-period of time without displaying a counted number of the communication event, and when the preset period of time is over, statistical results for a plurality of the first preset sub-periods of time are added together to obtain the number of the communication event within the preset period of time. For example, when the preset period of time is half a year, because a time limit exists in saving the communication record by the mobile terminal, the communication record may be pre-counted every other month, and when the half a year is over, the numbers of communication events of six months are correspondingly added together to obtain the number of communication event of the half a year.

By using the method provided in the embodiment of the present invention, the communication record of the mobile terminal is extracted and analyzed, and a state of contacting between a contact and a mobile terminal user is counted, so that it is convenient for the user to count and analyze states of contacting different contacts, analyzing and maintaining interpersonal relationships, and managing a system of the contact card. Meanwhile, a statistical result is displayed in a contact card book of a mobile phone, intuitively displaying a latest contact state, so that it is convenient for the user to process and maintain interpersonal communications, thereby enhancing and promoting communication and life for people.

Figure 2:
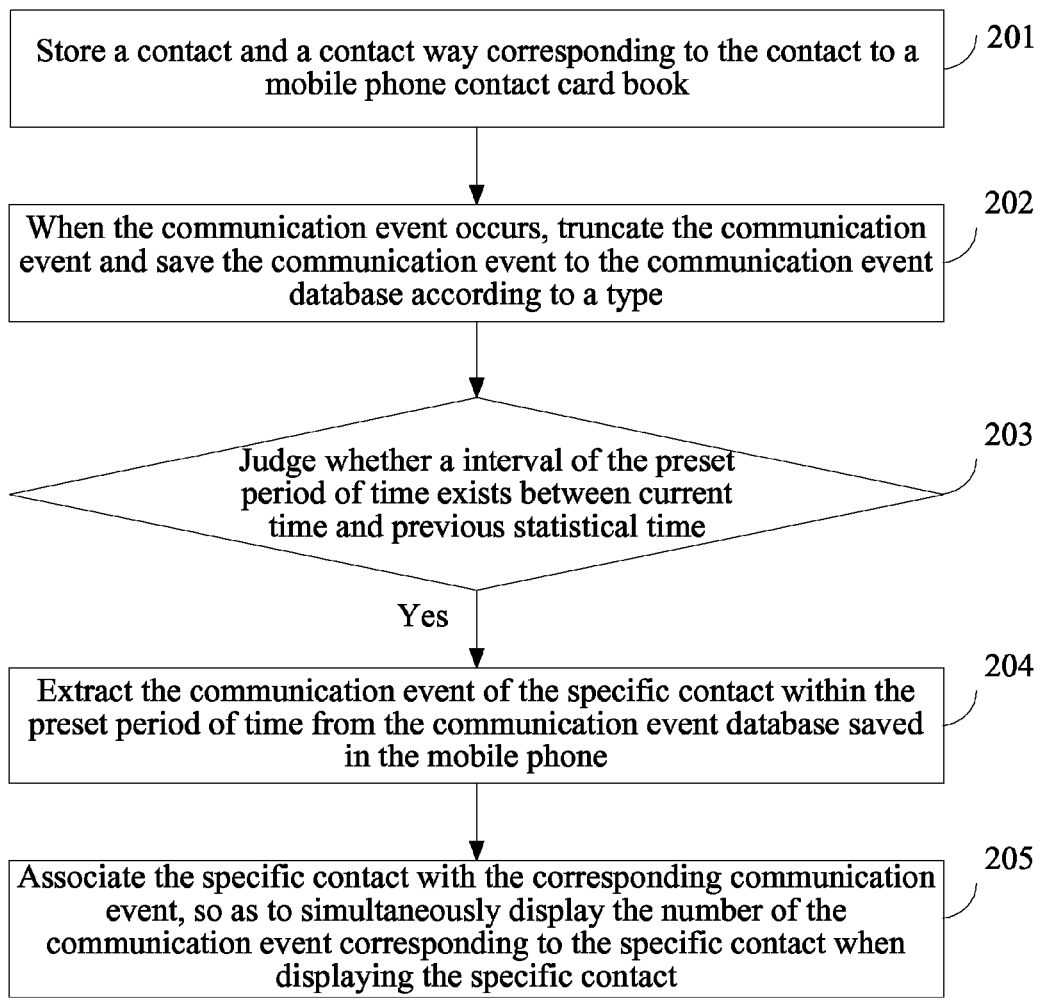
FIG. 2 is a flow chart of a method for managing a contact card of a mobile terminal according to an embodiment of the present invention.

FIG. 2 is a flow chart of a method for managing a contact card of a mobile terminal according to an embodiment of the present invention. A main body executing the embodiment of the present invention is the mobile terminal. The mobile terminal may be a personal digital assistant (PDA), a digital music player (e.g., an MP3 player), a mobile phone, and the like that has a communication function. In the embodiment of the present invention, the mobile terminal being a mobile phone is merely taken as an example, and a contact card book of the mobile terminal is specifically a contact card book of a mobile phone. Preferably, a communication record of the mobile terminal is a communication event database. The communication event database includes a contact, time, and a communication event type of an occurred communication event. Referring to FIG. 2, the method includes:

201: Store a contact and a contact way corresponding to the contact to a mobile phone contact card book.

Persons skilled in the art may know that, the contact way includes a mobile phone number, a residential number, and the like, and that one contact may correspond to a plurality of mobile phone numbers.

Further, the mobile phone saves a preset statistical period of time (for example, a latest month). When a specific statistical object is appointed by a mobile phone user, the specific statistical object is saved as a specific contact.

It should be noted that, when a contact and a contact way corresponding to the contact are input by the mobile phone user, a statistical period of time of the contact may be set at the same time. Moreover, the setting of the statistical preset period of time only needs to be performed before the counting and has no specific time limit.

202: When the communication event occurs, truncate the communication event and save the communication event to the communication event database according to a type of the communication event.

It should be noted that, the communication event database includes a contact, time, and a communication event type of the occurred communication event.

In the embodiment of the present invention, the communication event database records each call and each short message operation record in the mobile phone. The communication event database includes a contact name, time, an event type (making a call, answering a call, sending a short message, or receiving a short message), and the like. One communication record is added into the communication event database for each communication event.

For data storage formats of the communication event database, reference may be made to Table 1. Table 1 is an example of a data storage format of the communication event database provided in the embodiment of the present invention.

TABLE 1

| Name of contact | Time | Event type |
| --- | --- | --- |
| Zhang San | 2010-12-04 11:25 | Making a call |
| Li Si | 2010-12-03 17:30 | Answering a call |
| Zhang San | 2010-12-03 10:11 | Sending a short message |
| ... | ... | ... |

Specifically, step 202 includes: when a communication event occurs, save a type of the communication event, a contact, and occurring time of the communication event to the communication event database, and one corresponding record is added into the communication event database.

203: Judge whether an interval of the preset period of time exists between current time and previous statistical time; if yes, execute step 204; and if no, end the process.

The judgment of the interval of the period of time may be implemented by a timer, a clock, or other timing functions, which is not limited in the embodiment of the present invention.

204: Extract the communication event of the specific contact within the preset period of time from the communication event database saved in the mobile phone.

Specifically, the number of incoming calls, the number of outgoing calls, the number of received short messages, and the number of sent short messages within the latest period of time are counted according to the communication event database which is accessed on a current date.

205: Associate the specific contact with the corresponding communication event, so as to simultaneously display the number of the communication event corresponding to the specific contact when displaying the specific contact.

In the embodiment of the present invention, in addition to conventional items such as contact names and contact ways, a statistical result column of communication events is also added into the contact card book. When looking over the contact card book, a mobile terminal user may intuitively view a statistical result of the latest state of communicating with each contact (for example, the number of calls and the number of short messages of the latest one month).

A mobile terminal having a communication event statistical function may be a mobile phone. For a format of a mobile phone contact card book, reference may be made to Table 2 in the following. Table 2 is an example of data format of the mobile phone contact card book provided in the embodiment of the present invention.

TABLE 2

| Name | Mobile phone number | Phone | ... | The number of incoming calls | The number of outgoing calls | Received short message | Sent short message |
|---|---|---|---|---|---|---|---|
| Zhang San | 135xx | 0755x | ... | 13 | 20 | 8 | 5 |
| Li Si | 159xx | 0755x | ... | 37 | 28 | 20 | 17 |
| Wang Wu | 189xx | 0755x | ... | 2 | 0 | 1 | 1 |

From the above contact card book data, when looking over the contact card book, a user may intuitively view a statistical result of the communication event with each contact within the preset period of time, and may intuitively view a latest state of contacting each person, including the number of latest calls/short messages and the like.

Further, the method further includes: analyzing the communication event in the communication record of the mobile terminal according to a preset form. Specifically, the preset form may be any one or more following: (1) appointing a contact, counting the number of the communication event within the period of time according to a form of "month," "week," and the like to generate a statistical report for analyzing a contact number tendency with the contact within one period of time; and (2) performing horizontal counting on communication events of contacts in the entire contact card book to generate a report for analyzing contact frequencies with different contacts. The preset form may further include a plurality of models, which may be set by the mobile terminal user according to requirements of the mobile terminal user, which is not limited in the embodiment of the present invention.

Persons skilled in the art may know that, when a system date is updated, according to a current date, data in the communication event database is recounted and a statistical result is updated and stored as the statistical result to a corresponding contact in the contact card book.

By using the method provided in the embodiment of the present invention, the communication record of the mobile terminal is extracted and analyzed, and a state of contacting between a contact and a mobile terminal user is counted, so that it is convenient for the user to count and analyze states of contacting different contacts, analyzing and maintaining interpersonal relationships, and managing a contact card system. Meanwhile, a statistical result is displayed in the contact card book of the mobile phone, intuitively displaying a latest contact state, so that it is convenient for the user to process and maintain interpersonal communications, thereby enhancing and promoting communication and life for people.

Figure 3:
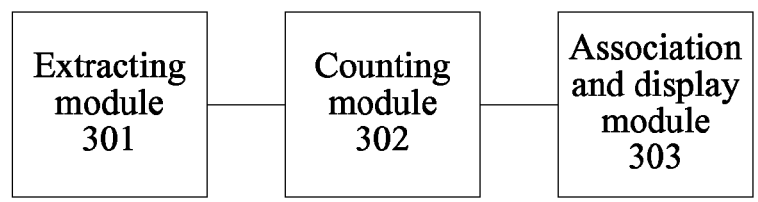
FIG. 3 is a schematic structural diagram of a device for managing a contact card of a mobile terminal according to an embodiment of the present invention.

FIG. 3 is a schematic structural diagram of a device for managing a contact card of a mobile terminal according to an embodiment of the present invention. Referring to FIG. 3, the device includes: an extracting module 301 configured to: for every other preset period of time, extract a communication event of a specific contact within the preset period of time from a communication record of the mobile terminal; a counting module 302 configured to count the number of the communication event of the specific contact according to a type of the communication event; and an association and display module 303 configured to associate the specific contact with the corresponding communication event, so as to simultaneously display the number of the communication events of the specific contact when displaying the specific contact.

The communication record of the mobile terminal is a communication event database. The communication event database includes a contact, time, and a communication event type of an occurred communication event.

Figure 4:
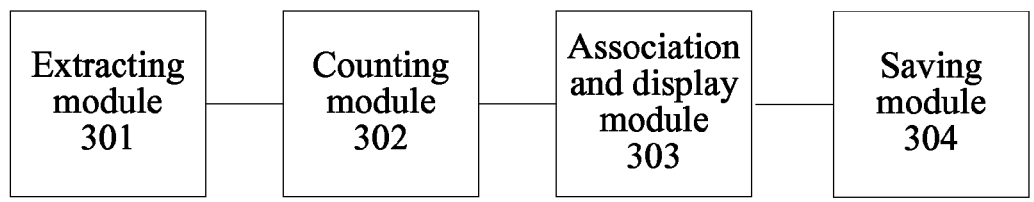
FIG. 4 is a schematic structural diagram of a device for managing a contact card of a mobile terminal according to an embodiment of the present invention.

Referring to FIG. 4, the device further includes: a saving module 304 configured to: when a communication event occurs, save the communication event to the communication event database according to a type of the communication event.

Figure 5:
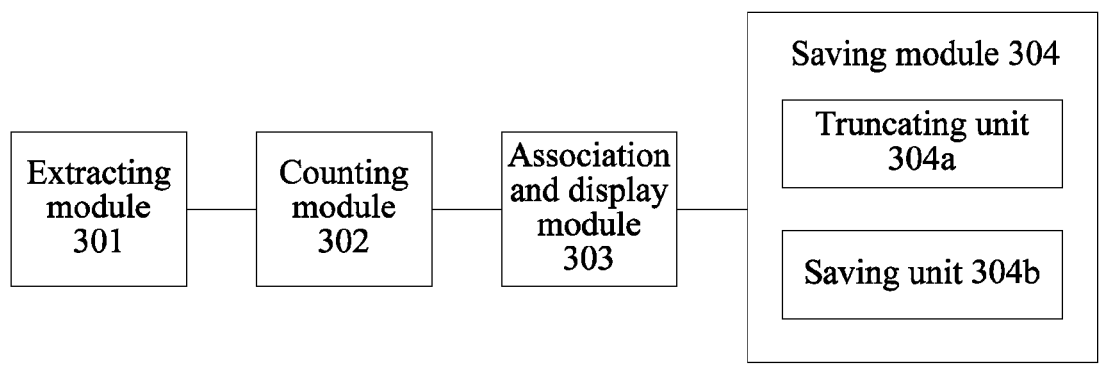
FIG. 5 is a schematic structural diagram of a device for managing a contact card of a mobile terminal according to an embodiment of the present invention.

Referring to FIG. 5, the saving module 304 specifically includes: a truncating unit 304a configured to truncate the communication event; and a saving unit 304b configured to: when an occurred communication event is truncated by the truncating unit 304a, save a type of the communication event, a contact, and occurring time of the communication event to the communication event database.

Figure 6:
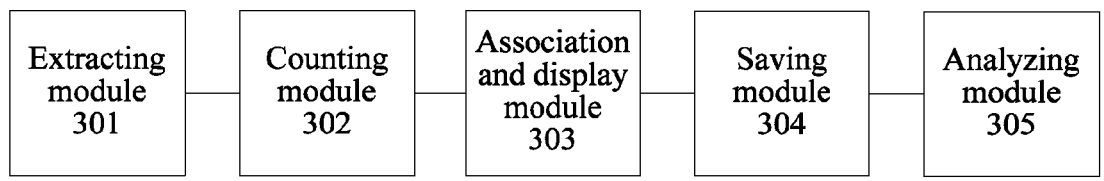
FIG. 6 is a schematic structural diagram of a device for managing a contact card of a mobile terminal according to an embodiment of the present invention.

Referring to FIG. 6, the device further includes: an analyzing module 305 configured to analyze the communication event in the communication record of the mobile terminal according to a preset form.

The communication event includes: making a call, answering a call, sending a short message, and receiving a short message.

The device provided in this embodiment belongs to the same conception of the method embodiments, and for the specific implementation process, reference may be made to the method embodiments, which is not described here again.

By using the device provided in this embodiment, the communication record of the mobile terminal is extracted and analyzed, and a state of contacting between a contact and a mobile terminal user is counted, so that it is convenient for the user to count and analyze states of contacting different contacts, analyzing and maintaining interpersonal relationships, and managing a contact card system. Meanwhile, a statistical result is displayed in a mobile phone contact card book, intuitively displaying a latest contact state, so that it is convenient for the user to process and maintain interpersonal communications, thereby enhancing and promoting communication and life for people.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. A method for managing a contact card of a mobile terminal comprising:
    extracting a communication event of a specific contact within a preset period of time from a communication record of the mobile terminal for every other preset period of time;
    counting a number of the communication event of the specific contact according to a type of the communication event;
    associating the specific contact with the communication event corresponding to the specific contact; and
    simultaneously displaying in a contact card book the number of the communication event of the specific contact when displaying the specific contact, wherein the contact card book simultaneously displays on the mobile terminal contact frequency statistics for the specific contact and for a plurality of other contacts,
    wherein the contact frequency statistics for the specific contact and for the plurality of other contacts is displayed on the mobile terminal in a table comprising a plurality of columns and a plurality of rows,
    wherein the plurality of columns comprises a name column, a mobile phone number column, a phone number column, a number of incoming calls column, a number of outgoing calls column, a number of received short messages column, and a number of sent short messages column, and
    wherein the plurality of rows displays name information, mobile phone number information, phone number information, number of incoming call information, number of outgoing call information, number of received short messages information, and number of sent short messages information for the specific contact and for the plurality of other contacts.

2. The method according to claim 1, wherein the communication record of the mobile terminal is a communication event database, and wherein the communication event database comprises a contact, a time, and a communication event type of an occurred communication event.

3. The method according to claim 2, further comprising saving a communication event to the communication event database according to the type when the communication event Occurs.

4. The method according to claim 3, wherein saving the communication event to the communication event database according to the type comprises saving the type of the communication event, the contact, and occurring time of the communication event to the communication event database when the communication event occurs.

5. The method according to claim 1, further comprising analyzing the communication event in the communication record of the mobile terminal according to a preset form.

6. The method according to claim 1, wherein the communication event comprises making a call, answering a call, sending a short message, and receiving a short message.

7. The method according to claim 1, wherein the communication record of the mobile terminal is a communication event database, wherein the communication event database comprises another plurality of columns and another plurality of rows, wherein the another plurality of columns comprises a name of contact column, a time column, and an event type column, and wherein each of the another plurality of rows comprises a name, a time, and an event corresponding to a communication with the mobile terminal.

8. The method according to claim 1, wherein before extracting the communication event of the specific contact, the method comprises judging whether an interval of the preset period of time exists between a current time and a previous statistical time, and extracting the communication event of the specific contact when the interval of the preset period of time exists between the current time and the previous statistical time.

9. The method of claim 1, wherein the preset period of time is set based on a user input.

10. The method of claim 1, wherein the plurality of other contacts are set based on a user input, and wherein the plurality of other contacts comprises less than all contacts in the contact card book.

11. A device for managing a contact card of a mobile terminal comprising:
    an extracting module configured to extract a communication event of a specific contact within a preset period of time from a communication record of the mobile terminal for every other preset period of time;
    a counting module configured to count the number of the communication event of the specific contact according to a type of the communication event; and
    an association and display module configured to associate the specific contact with the communication event corresponding to the specific contact to simultaneously display in a contact card book the number of the communication event of the specific contact when displaying the specific contact, wherein the contact card book simultaneously displays on the mobile terminal contact frequency statistics for the specific contact and for a plurality of other contacts,
    wherein the contact frequency statistics for the specific contact and for the plurality of other contacts is displayed on the mobile terminal in a table comprising a plurality of columns and a plurality of rows,
    wherein the plurality of columns comprises a name column, a mobile phone number column, a phone number column, a number of incoming calls column, a number of outgoing calls column, a number of received short messages column, and a number of sent short messages column, and
    wherein the plurality of rows displays name information, mobile phone number information, phone number information, number of incoming call information, number of outgoing call information, number of received short messages information, and number of sent short messages information for the specific contact and for the plurality of other contacts.

12. The device according to claim 11, wherein the communication record of the mobile terminal is a communication event database, and wherein the communication event database comprises a contact, a time, and a communication event type of an occurred communication event.

13. The device according to claim 12, further comprising a saving module configured to save the communication event to the communication event database according to the type when the communication event occurs.

14. The device according to claim 13, wherein the saving module specifically comprises:
- a truncating unit configured to truncate the communication event; and
- a saving unit configured to save the type of a communication event, the contact, and occurring time of the communication event to the communication event database when the occurred communication event is truncated by the truncating unit.

15. The device according to claim 11, further comprising an analyzing module configured to analyze the communication event in the communication record of the mobile terminal according to a preset form.

16. The device according to claim 11, wherein the communication event comprises making a call, answering a call, sending a short message, and receiving a short message.

17. The device according to claim 11, wherein the preset period of time is set based on a user input, wherein the plurality of other contacts are set based on a second user input, and wherein the plurality of other contacts comprises less than all contacts in the contact card book.

18. The device according to claim 11, wherein the communication record of the mobile terminal is a communication event database, wherein the communication event database comprises another plurality of columns and another plurality of rows, wherein the another plurality of columns comprises a name of contact column, a time column, and an event type column, and wherein each of the another plurality of rows comprises a name, a time, and an event corresponding to a communication with the mobile terminal.

* * * * *

UNITED STATES PATENT AND TRADEMARK OFFICE
CERTIFICATE OF CORRECTION

| | | Page 1 of 1 |
|---|---|---|
| PATENT NO. | : 9,020,560 B2 | |
| APPLICATION NO. | : 13/776472 | |
| DATED | : April 28, 2015 | |
| INVENTOR(S) | : Feng Xiong | |

It is certified that error appears in the above-identified patent and that said Letters Patent is hereby corrected as shown below:

In the Claims:

Column 7, Lines 58-61, Claim 3, should read as:

3. The method according to claim 2, further comprising saving a communication event to the communication event database according to the type when the communication event occurs.

Signed and Sealed this
Twenty-seventh Day of October, 2015

Michelle K. Lee
*Director of the United States Patent and Trademark Office*